United States Patent [19]

Rinaldi et al.

[11] 4,316,009
[45] Feb. 16, 1982

[54] PROCESS FOR THE PURIFICATION OF POLYCARBONATE SOLUTIONS

[75] Inventors: Roberto Rinaldi, Mantova; Gabriele Govoni, Renazzo; Francesco Visani, Milan, all of Italy

[73] Assignee: Montedison S.p.A., Milan, Italy

[21] Appl. No.: 117,787

[22] Filed: Feb. 1, 1980

[30] Foreign Application Priority Data

Feb. 5, 1979 [IT] Italy .............................. 19884 A/79

[51] Int. Cl.³ .............................................. C08J 3/16
[52] U.S. Cl. .................................... 528/502; 260/34.2
[58] Field of Search ....................... 528/482, 499, 502

[56] References Cited

U.S. PATENT DOCUMENTS

| 3,200,105 | 8/1965 | Barber | 528/502 |
| 3,505,273 | 4/1970 | Cleveland | 528/499 |
| 3,720,645 | 3/1973 | Nistri | 528/502 |
| 3,939,118 | 2/1976 | Horbach | 528/499 |
| 3,954,713 | 5/1976 | Schnoring | 528/499 |
| 4,177,343 | 12/1979 | Pannell | 528/482 |

Primary Examiner—Paul R. Michl

[57] ABSTRACT

Organic-solvent solutions of polycarbonates containing impurities, e.g., sodium chloride and sodium carbonate formed during the preparation of the polycarbonates, and/or catalysts, are purified by sending aqueous emulsions of polycarbonates in water-immiscible organic solvents, in particular the aqueous emulsions coming from the various purification phases of the organic polycarbonate solutions obtained in the synthesis, through a layer of fibers in which the dispersed droplets of the emulsion coalesce, with the formation of two layers each consisting essentially of one of the two separate phases of the emulsion.

5 Claims, 4 Drawing Figures

FIG. 1
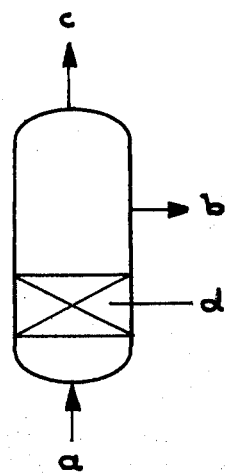
FIG. 3
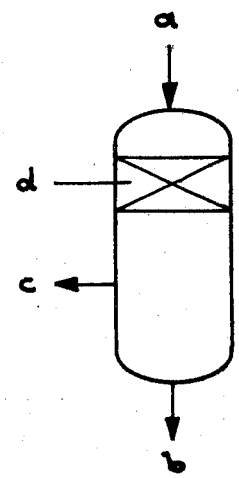
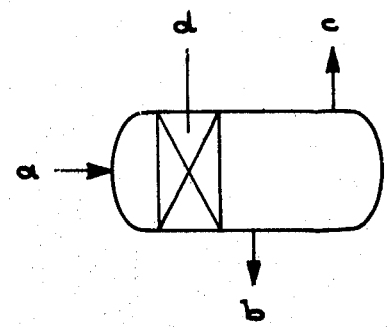
FIG. 2

PROCESS FOR THE PURIFICATION OF POLYCARBONATE SOLUTIONS

Depending on the method used to prepare the polycarbonates, the organic solvent solutions thereof contain various impurities or by-products and are commonly treated with water or aqueous solutions of various pH values necessary for removing the impurities or by-products of the polycarbonate synthesis, resulting in aqueous emulsions from which the polycarbonate is recoverd.

The aromatic polycarbonates are preferably prepared by interfacial polycondensation, reacting phosgene with aromatic bisphenols in a system consisting of an aqueous alkaline solution and of an organic solvent of the polymer, immiscible with said aqueous solution.

The reaction leads to the formation of appreciable quantities of by-products, that is, alkaline salts such as sodium chloride and sodium carbonate, unreacted monomers (mono- and bisphenols) present in the form of alkaline salts, which in general accumulate in the aqueous phase of the reaction raw material besides the excess in alkaline hydrate and reducing salts such as sulphites, phosphites, thiosulphates and the like, used for hindering the oxidation reactions of phenols.

Other products such as the impurities present in the starting raw materials, the catalysts of the polycondensation reaction, such as the tertiary amines, quaternary ammonium salts and the like may, on the contrary, distribute themselves in one or in both phases, depending on their chemical and solubility characteristics.

On the other hand, in order to obtain a polycarbonate with high characteristics, in particular thermal stability, optical properties such as transparency and color, physical-mechanical properties, it is necessary to remove from the polymer also the slightest traces of foreign matter and thus the impurities mentioned above.

The removal of said impurities from the polymer normally is carried out by purifying the organic solutions of polycarbonate such as those that are obtained from the raw reaction product after gravity separation of the aqueous phase.

More particularly, the purification of the organic solutions of polycarbonate is achieved by intimately contacting said solutions with water and with aqueous solutions, in a series of successive stages, under various pH conditions comprised between from 2 to more than 13, required by the type of impurities that have to be removed.

The efficiency of the purification operation depends, besides on the degree of intimate mixing between phases, also and mainly on the degree of separation that is possible to be achieved between the two phases for each single washing stage.

Taking into consideration the high viscosity of the polycarbonate solutions in the organic solvents, of the degree of mutual dispersion of the two phases necessary to achieve an effective washing with the consequential formation of very stable dispersions, it was necessary, in order to achieve an effective separation between the organic phase and the aqueous phase forming the emulsion, to subject the latter to very high gravitational forces such as are attained in liquid-liquid centrifuges.

Practically, the separation of the two phases was achieved industrially just by the use of such centrifuges.

However, if, on the one hand, use of the liquid-liquid centrifuges allows an efficient separation of the two phases, on the other hand such use has numerous drawbacks, mainly connected with the technological complexity of these same centrifugal apparatuses and with the characteristics of the polycarbonate solutions to be separated.

Thus, a lot of problems are met in case one has to operate with such centrifuges on polycarbonate solutions in methylene chloride, which is the preferential solvent in the case of interfacial polycondensation, thanks to its solvent power towards the polymer and to its high density with respect to water, a fact that facilitates the separation from the same.

One problem, for instance, is connected with the low boiling point (40° C.) of methylene chloride, which requires the insertion of a cooling between the various washing stages because the heating caused by the centrifuging operation is quite considerable.

Moreover, methylene chloride shows a considerable aggressiveness towards the materials used for sealing the centrifuges.

Although other solvents of polycarbonate may be used, chosen out of the class of the aliphatic chlorinated hydrocarbons such as chloroform and 1,2-dichloroethane, or aromatic hydrocarbons such as monochlorobenzol, ortho-dichlorobenzol, or aromatic ethers such as anisol and the like, their use considerably reduces the potential output of the centrifuges. This is both because of the lesser difference in density between the polycarbonate solutions and water, as well as the fact that there must be used solutions having a lower concentration in polycarbonate in relation to the lower solvent power of said hydrocarbons.

Moreover, the selection of the building materials for the centifuges is much more critical inasmuch as they have to operate within a wide range of pH conditions that may go from 2 to more than 13, conditions that are met with in the various washing stages.

Other alternative purification technologies, such as the washing by extraction in counter-current and separation by gravity of the two phases, are scarcely effective and are not suited for industrial applications.

THE PRESENT INVENTION

One object of this invention is to provide an improved continuous process for the purification of polycarbonate solutions as directly obtained in synthesis and which contain considerable quantities of reaction impurities, which process does not present the problems met with the heretofore known processes, is more economical than said known processes, and which permits the complete separation of the two phases of the emulsions obtained by intimately contacting organic-solvent solutions of polycarbonate with water or aqueous solutions of various pH values in order to remove the reaction impurities.

That and other objects are accomplished by the invention in accordance with which aqueous emulsions of polycarbonates in water immiscible organic solvents, in particular the aqueous emulsions coming from the various purification phases of the organic polycarbonate solutions obtained in the synthesis, are sent through a layer of fibers in which there occurs a coalescence of the dispersed droplets and the formation of two layers consisting essentially of one of the separate phases of the emulsion.

The present process of separating aqueous solutions from polycarbonate solutions is extraordinarily efficient since it has been possible to reduce the content in water in the separated organic phase to values very near those of its solubility.

Prior to this invention, in order to obtain a degree of separation comparable with that obtained with the process of this invention, it was necessary to operate on liquid-liquid centrifuges, and with the drawbacks described hereinabove.

By the process of this invention it is possible to separate highly stable emulsions, prepared with static mixers, turbo-mixers and other types of particularly effective mixers, emulsions that also show a particularly wide ponderal ratio, in general comprised between 0.2 and 50 between the two phases (organic phase in which there is the dissolved polycarbonate, and the aqueous phase of the washing).

The present process is also effective for emulsions having a very high apparent viscosity, with the advantage of allowing the use of organic polycarbonate solutions of a very high concentration or, alternatively, at equal concentration of the polycarbonate in the solvent, allowing the use of a polycarbonate with a high molecular weight.

The present process includes a series of aqueous washings in which each washing stage is realized by the emulsioning of the organic solution with an aqueous phase of suitable pH comprised between 2 and 14, and by the successive separation of the two phases, characterized in that said separation is achieved by sending the aqueous emulsion, at a spatial velocity of 0.01-2 cm/sec., through a layer of fibers 10-500 mm thick, and having an apparent density of 0.2-0.7 g/cu.cm, and by continuously removing the phases that separate, in the form of two layers, through and beyond the layer of fibers.

The emulsions that may be treated according to the process of this invention have a ponderal ratio between organic phase and the aqueous phase of between 0.2 and 50 and a concentration of the polycarbonate in the organic phase preferably comprised between 10% and 20% by weight.

The fibers of the layer may be chosen from amongst inorganic, natural or synthetic fibers such as glass wool, metal fibers, polytetrafluoroethylene fibers, polyamidic fibers, polyvinyl alcohol-based fibers, polyolefin fibers, carbon and cotton fibers.

However, it must be kept in mind that the choice of the type of fiber is conditioned by the aggressiveness of the emulsions and in particular on the pH values of the solution that must be separated. By "aggressiveness" is meant the effect of the solvent present in the emulsions on the fibers.

In this way, in the alkaline washing stages, in which the separation occurs in an alkaline medium, excellent results are obtained by using metal fibers based on steels resistant to corrosion typical for the medium due to the presence of methylene chloride or other chlorinated organic solvents, of sodium hydroxides, sodium carbonate, sodium chloride and for pH values up to 13.5.

Operating in an acid medium, for instance phosphoric acid, sulphuric or hydrochloric acid, there may be used metal wools resistant to the corrosion typical of the medium used, or glass wools.

In general, best results are obtained by using metal or glass fibers.

The fibers used for the present purpose have, preferably, diameter of between 5 and 200 microns.

The separating equipment used for achieving the process of this invention does not show any substantial complications from the construction or operating point of view.

Such equipment consists essentially of a tubular vessel in which is placed a layer of fibers forming the coalescence bed, and an empty space in which there takes place the stratification by gravity of the two phases forming the emulsion, and which vessel is provided with an inlet for the emulsion and two (2) outlets for the two phases that separate from the emulsion itself.

It is to be noted that the choice of the materials for the construction of the separating equipment is not as critical as in the case of the liquid-liquid centrifuges, it being possible to make the choice just on the basis of the specific conditions of chemical aggressiveness that are met within the single washing stages in which they will be used.

Moreover, in comparison with the liquid-liquid centrifuges, the installation and operating costs of the apparatus suitable for carrying out the process of this invention is very much lower, about 80% less for each washing section, and at the same time it has a very high degree of reliability.

Suitable equipment for carrying out the present process is shown in the accompanying drawing, in which:

FIG. 1 is a schematic showing of one suitable, not limiting, type of separation apparatus;

FIG. 2 is a schematic showing of another suitable, not limiting, type of separation apparatus;

FIG. 3 is a schematic showing of a still further non-limiting type of suitable separation apparatus.

Figure 4:
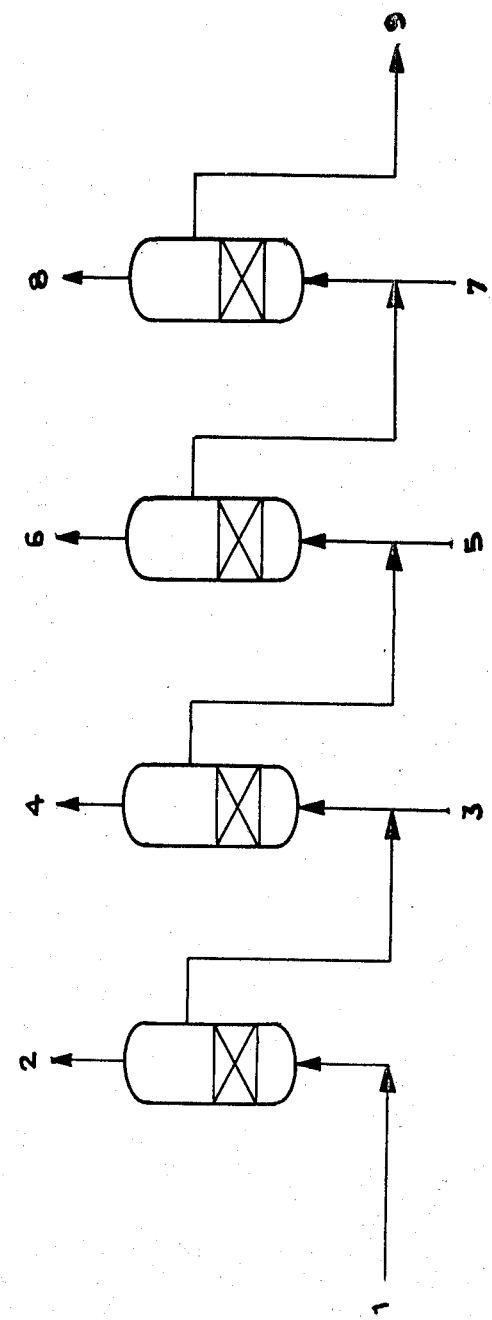
FIG. 4 is a schematic showing of a series of suitable separators for washing and separating the emulsion into layers in several stages.

Referring to the drawings, there is shown a separation vessel provided with an inlet and two outlets. The aqueous emulsion to be separated into the two phases is introduced into the vessel through the inlet (not shown) in the direction of arrow (a) and passed through the layer of fibers (d). The organic phase (the heavier phase) passes out of the vessel through an outlet (not shown) in the direction of arrow (b) and the aqueous phase leaves the vessel through a different outlet (not shown) in the direction of arrow (c).

As indicated, it is not only possible to use separation apparatus of the kind shown in FIG. 1, but also a phase separator as shown in FIGS. 2 and 3, or a combination of the systems in the various stages of the washing and as illustrated in FIG. 4.

Said apparatus has proved to be very versatile inasmuch as it is possible to scale it up or down within a wide range of specific output capacities which may attain very high values considering that the spatial velocities of the liquids may be varied within the range of 0.01-2 cm/sec.

The emulsions can be forced through the fiber layer to achieve very rapid separations of the two phases with the advantage of not suffering losses of polycarbonate in the separated aqueous phase, and of reducing the number of washing stages required.

In general, it is possible to separate an aqueous phase in which a polycarbonate solution is not present, and an organic phase containing less than 0.40% by weight of water.

The solutions having concentrations of 12–17% in polycarbonate, subjected to the purification process according to this invention, show a tinting, expressed in APHA degrees, of at most 5 and have a residual content in catalyst that is very low, less than 5 ppm. in the case of triethylamine.

Said polycarbonate solutions thus purified, are freed of the solvent, for instance according to the process described in Govoni et al. European Patent Application No. 791.00514.3, published on Sept. 19, 1979 with the publication No. of 0003996 A 1. The powders, subjected to granulation in a single-screw extruder, at a temperature between 260° and 280° C., show the following characteristics:

| | |
|---|---|
| maximum content in ashes | 15 ppm |
| maximum content in metals (Fe, Cr, Ni) | 0.5 ppm |
| Optical properties: | |
| total transmittance, ASTM D 1003-61 min. | 89.5 % |
| Haze ASTM D-1003-61 ASTM D-1003-61 max. | 1.2 % |
| Yellow index, ASTM D 1925 max. | 2. % |
| Intrinsic stability greater than | 0.90 |

The intrinsic stability, which is associated also with the level of residual impurities, represents the relationship between the viscosities in the molten state measured on a rheometer and determined on a polymer sample respectively at 60 minutes and at zero time.

In the case of polycarbonate prepared from bisphenol-A, the residual content in bisphenol-A in the purified polymer was found to be less than 5 ppm.

By this process it is possible to purify not only the aromatic polycarbonates but also the aliphatic or aromatic-aliphatic polycarbonates prepared by interfacial polycondensation. Additionally, the polycarbonate solution may be one resulting from preparation of the polycarbonate by other techniques, such as, for instance, by polymerization in solution.

Moreover it is also possible to use various types of solvents of polycarbonate, provided they are immiscible with water.

The following examples are given to illustrate the invention in more detail, and are not to be taken as limiting the same.

EXAMPLES 1–7

There were carried out tests of the separation of polycarbonate solutions in methylene chloride, from emulsions in demineralized water, using 7 different types of fibers as coalescence bed. The apparatus used for the purpose was of the type schematically represented in FIG. 1 of the drawing, and which had an inside diameter of 200 mm, filled up to a height of 120 mm with a layer of fibers of the type and characteristics specified for each test in Table I, infra.

Into the apparatus was fed, at 25° C. and at the spatial velocities specified in Table I, an aqueous emulsion consisting of 1 part by weight of demineralized water and 5 parts by weight of a solution in methylene chloride containing 15% by weight of polycarbonate, obtained by interfacial polycondensation from bisphenol-A, and having an intrinsic viscosity of 0.52 dl/g, measured in p-dioxane at 30° C.

In the upper zone of the reaction vessel there formed two layers of liquid, one above the other and perfectly limpid. The upper layer consisted of methylene chloride saturated water.

The lower layer consisted of the polycarbonate solution in which were present small quantities of water as reported in Table I.

EXAMPLES 8–13

Using the glass fibers as a coalescence bed, there were carried out 6 separation tests in which there were varied the spatial velocities of the feeding of the aqueous dispersions, as well as the concentrations of polycarbonate in the solution of methylene chloride dispersed in the aqueous phase.

At the spatial velocities reported in Table II, and at 25° C., various aqueous emulsions prepared from solutions of polycarbonate in methylene chloride, having an intrinsic viscosity of 0.52 dl/g, and prepared by interfacial polycondensation from bisphenol-A, were fed into the apparatus shown in FIG. 1 of the drawing, having an inner diameter of 200 mm, and filled for a height of 120 mm with a layer of glass fibers having a diameter of 25 microns, and in which the apparent density of the layer was 0.39 g/cc.

The characteristics of the emulsions fed in, as well as the characteristics of the separate phases, are reported in Table II.

TABLE I

| Example | | 1 | 2 | 3 | 4 | 5 | 6 | 7 |
|---|---|---|---|---|---|---|---|---|
| Type of fiber | | glass | stainless steel | cotton | PTFE | rayon | nylon | polypropylene |
| Diameter of fiber | microns | 25 | 50 | 30 | 110 | 25 | 20 | 10 |
| Thickness of fiber layer | mm | 120 | 120 | 120 | 120 | 120 | 120 | 120 |
| Apparent density of layer of fibers | g/cm³ | 0.40 | 0.50 | 0.20 | 0.65 | 0.43 | 0.22 | 0.20 |
| Ponderal ratio organic phase/ aqueous phase of the emulsion | | 5 | 5 | 5 | 5 | 5 | 5 | 5 |
| Content in polycarbonate in the organic phase | % b.w. | 15 | 15 | 15 | 15 | 15 | 15 | 15 |
| Spatial feeding velocity | cm/sec. | 0.3 | 0.3 | 0.1 | 0.1 | 0.1 | 0.1 | 0.1 |
| Content in water in the separated organic phase | % b.w. | 0.16 | 0.17 | 0.16 | 0.50 | 0.60 | 0.55 | 0.40 |
| Content in polycarbonate solution in the separated aqueous phase | % b.w. | 0 | 0 | 0 | 0 | 0 | 0 | 0 |

TABLE II

| Example | | 8 | 9 | 10 | 11 | 12 | 13 |
|---|---|---|---|---|---|---|---|
| Type of fiber | | glass | glass | glass | glass | glass | glass |
| Diameter of fiber | microns | 25 | 25 | 25 | 25 | 25 | 25 |
| Thickness of layer of fibers | mm | 120 | 120 | 120 | 120 | 120 | 120 |
| Apparent density of layer of | | | | | | | |

TABLE II-continued

| Example | | 8 | 9 | 10 | 11 | 12 | 13 |
|---|---|---|---|---|---|---|---|
| fibers | g/cm³ | 0.39 | 0.39 | 0.39 | 0.39 | 0.39 | 0.39 |
| Ponderal ratio organic phase/ aqueous phase of emulsion | | 5 | 5 | 5 | 2 | 5 | 5 |
| Content in polycarbonate in the organic phase | % b.w. | 15 | 10 | 18 | 15 | 15 | 18 |
| Spatial feeding velocity | cm/sec. | 0.3 | 0.3 | 0.3 | 0.3 | 0.1 | 0.6 |
| Content in water in the separated organic phase | % b.w. | 0.16 | 0.16 | 0.20 | 0.21 | 0.23 | 0.24 |
| Content in polycarbonate solution in the separated aqueous phase | % b.w. | 0 | 0 | 0 | 0 | 0 | 0 |

EXAMPLE 14

There was carried out a washing test and the separation in several stages, in a continuous way, of a polycarbonate solution combine from a process of interfacial polycondensation, according to the operating scheme shown in FIG. 4, by using four separators A B C D of the type illustrated in FIG. 1, in which the coalescence bed, 120 mm high and having a density of 0.50 g/cc, consisted of inox steel fibers having a diameter of 50 microns.

The polycarbonate obtained from bisphenol-A had an intrinsic viscosity of 0.52 dl/g. The feeding rate of the liquids in the various stages was maintained at 0.3 cm/sec.

With reference to FIG. 4, numeral 1 indicates the feeding, into separator A, of the emulsion formed by the polycarbonate elmulsion and by the aqueous solution coming from synthesis. The emulsion had the following composition:

| organic phase: | |
|---|---|
| polycarbonate | 12% by weight |
| $CH_2Cl_2$ | 88% by weight |
| triethylamine | 240 ppm |
| aqueous phase: | |
| $H_2O$ | 89.04% by weight |
| NaCl | 9.50% by weight |
| NaOH | 0.25% by weight |
| $Na_2CO_3$ | 1.20% by weight |
| ferric acid salts | 0.01% by weight. |

The ratio organic phase/aqueous phase was 1. The numerals 3, 5 and 7 indicate the feedings of the washing solutions having the following compositions, respectively;

3 aqueous solution of NaOH at 1% b.w. concentration,
5 aqueous solution of $H_3PO_4$ at 1.5% b.w. concentration,
7 water which were emulsified with the organic phase coming from the preceding separation stage, so as to have a ponderal ratio organic phase/washing solution of 5.

The numerals 2, 4, 6 and 8 indicate the discharges of the aqueous solutions after separation.

Numeral 9 indicates the final discharge of the purified polycarbonate solution, the composition of which was as follows:

| polycarbonate | 12.1 % by weight |
|---|---|
| methylene chloride | 87.73 % by weight |
| water | 0.17 % by weight |
| impurities: triethylamine | <1 ppm |
| $Na^+$ | <1 ppm |
| $Cl^-$ | <1 ppm |
| phenols | <1 ppm |

The solvent was removed from the solution leaving discharge point 9, according to the method described in pending Govoni et al. Ser. No. 14,161, supra, and after a successive granulation, there was obtained a polycarbonate of the following characteristics:

| ashes (residue of combustion at 800° C.) | <10 ppm |
|---|---|
| heavy metals | <1 ppm |
| phenols | <1 ppm |

The optical properties, determined on standard test specimen, were the following:

| Haze ASTM D 1003-61 | 1.2 | % |
|---|---|---|
| Transmittance ASTM D 1003-61 | 91. | %. |

What is claimed is:

1. A continuous process for the separation of the two phases of aqueous emulsions obtained by emulsifying organic solvent solutions of polycarbonates containing impurities with an aqueous phase at a selected pH comprised between 2 and 14 for removing said impurities, which process comprises sending the emulsions, at a spatial velocity of 0.01 to 2 cm/sec., through a layer of fibers 10 to 500 mm. thick and having an apparent density of 0.2 to 0.7 g/cc, and then continuously and separately removing, at a point beyond the layer of fibers, the two phases which separate in the form of two layers as the emulsion passes through the layer of fibers.

2. The process of claim 6, in which the aqueous emulsions which are passed through the layer of fibers and separated into two layers have a ponderal ratio organic phase/aqueous phase comprised between 0.2 and 50, and a concentration of polycarbonate in the organic phase comprised between 10 and 20% by weight.

3. The process according to claim 6, in which the fibers have a diameter of from 5 to 200 microns.

4. The process according to claim 6, in which the fibers are selected from the group consisting of glass fibers, corrosion-resisting steel fibers, cotton fibers and polypropylene fibers.

5. The process according to claim 4, in which the fibers have a diameter of from 5 to 200 microns.

* * * * *